United States Patent
Pettersson et al.

(10) Patent No.: US 12,213,133 B2
(45) Date of Patent: Jan. 28, 2025

(54) SELECTIVE RESTRICTION IN BEAMFORMED TRANSMISSION SCHEDULING

(71) Applicant: Telefonaktiebolaget LM Ericsson (publ), Stockholm (SE)

(72) Inventors: Emil Pettersson, Helsingborg (SE); Niclas Palm, Svedala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 356 days.

(21) Appl. No.: 17/639,476

(22) PCT Filed: Sep. 11, 2019

(86) PCT No.: PCT/EP2019/074241
§ 371 (c)(1),
(2) Date: Mar. 1, 2022

(87) PCT Pub. No.: WO2021/047771
PCT Pub. Date: Mar. 18, 2021

(65) Prior Publication Data
US 2022/0312453 A1   Sep. 29, 2022

(51) Int. Cl.
*H04W 72/1273* (2023.01)
*H04B 7/06* (2006.01)
(Continued)

(52) U.S. Cl.
CPC ...... *H04W 72/1273* (2013.01); *H04B 7/0617* (2013.01); *H04L 5/0048* (2013.01);
(Continued)

(58) Field of Classification Search
CPC . H04W 72/1273; H04W 72/52; H04W 24/08; H04W 72/046; H04B 7/0617; H04L 5/0048
See application file for complete search history.

(56) References Cited

U.S. PATENT DOCUMENTS 10,056,954 B2 *   8/2018   Fodor ................... H04W 72/23
10,506,464 B2 *  12/2019   Chen .................... H04B 7/0617
(Continued)

FOREIGN PATENT DOCUMENTS

| CN | 105706376 A | 6/2016 |
| CN | 107852624 A | 3/2018 |
| IN | 201747036621 A | 10/2017 |

OTHER PUBLICATIONS

LG Electronics, "Remaining details on L3 measurement and mobility management", 3GPP TSG RAN WG1 Meeting #90bis, Oct. 9-13, 2017, pp. 1-12, Prague, Czech Republic, R1-1717932.
(Continued)

*Primary Examiner* — Chandrahas B Patel
(74) *Attorney, Agent, or Firm* — Sage Patent Group

(57) ABSTRACT

A radio base station, RBS (10) of a wireless communication network indicates to a wireless device (14, 18, 20) where in the time and/or frequency domain to perform radio quality measurements. If the RBS (10) determines that one or more wireless devices (14, 18, 20) (including those that are idle) are in risk of performing deteriorated quality measurements, it refrains from scheduling beamformed downlink data in the time/frequency region where the wireless devices (14, 18, 20) perform quality measurements when the reference signals (e.g., Cell Specific Reference Signals, or CRS) are broadcast. This avoids deterioration of the RSRQ due to beamforming gain, and allows existing legacy features that rely on RSRQ to continue to function as originally intended. The restriction is only on beamformed data—the transmission of non-beamformed data in the relevant bandwidth is already accounted for in the use of RSRQ measurements.

20 Claims, 6 Drawing Sheets

(51) Int. Cl.
  *H04L 5/00* (2006.01)
  *H04W 24/08* (2009.01)
  *H04W 72/044* (2023.01)
  *H04W 72/52* (2023.01)

(52) U.S. Cl.
  CPC ......... *H04W 24/08* (2013.01); *H04W 72/046* (2013.01); *H04W 72/52* (2023.01)

(56) References Cited

U.S. PATENT DOCUMENTS

| | | | |
|---|---|---|---|
| 10,834,733 | B2* | 11/2020 | Nagaraja ............... H04B 7/0617 |
| 10,849,131 | B2* | 11/2020 | Chendamarai Kannan ................. H04B 7/0695 |
| 2018/0123648 | A1 | 5/2018 | Nagaraja et al. |
| 2018/0269956 | A1 | 9/2018 | Akkarakaran et al. |
| 2019/0261378 | A1 | 8/2019 | Kannan et al. |

OTHER PUBLICATIONS

Huawei et al., "The possible restrictions on the configuration of almost blank subframes in Macro-Pico deployments", 3GPP TSG RAN WGI meeting #62bis, Oct. 11-15, 2010, pp. 1-5, Xi'an, China, R1-105150.

3rd Generation Partnership Project, "Technical Specification Group Radio Access Network; Evolved Universal Terrestrial Radio Access (E-UTRA); Physical layer; Measurements (Release 12)", 3GPP TS 36.214 V12.0.0, Sep. 2014, pp. 1-14.

Ericsson; "MeasSubframePatternNeigh in measObjectEUTRA in NR"; 3GPP TSG-RAN WG2#103bis; R2-1814449; Chengdu, China; Oct. 8-12, 2018; 2 pages.

Office Action mailed Sep. 3, 2024 for Chinese Patent Application No. 201980100238.2; 8 pages (includes English translation).

LG Electronics; "Consideration on the measurement subframe cell List for TDM elCIC RRM measurements"; 3GPP TSG RAN WG4 Meeting #59AH; R4-113709; Bucharest, Romania; Jun. 27-Jul. 1, 2011; 5 pages.

* cited by examiner

PROCESSING CIRCUITRY
24

TIME AND FREQUENCY RANGE
DETERMINING UNIT

34

REFERENCE SIGNAL BROADCASTING
UNIT

36

BEAMFORMED TRANSMISSION
SCHEDULING REFRAINING UNIT

SOFTWARE
32

TIME AND FREQUENCY RANGE
DETERMINING MODULE
40

REFERENCE SIGNAL BROADCASTING
MODULE
42

BEAMFORMED TRANSMISSION
SCHEDULING REFRAINING MODULE
44

Figure 6

SELECTIVE RESTRICTION IN BEAMFORMED TRANSMISSION SCHEDULING

TECHNICAL FIELD

The present invention relates generally to wireless communication networks, and in particular to a system and method of mitigating interference with existing channel quality measurements by selectively restricting the use of beamforming.

BACKGROUND

Wireless communication networks provide voice and data communication between a network of fixed nodes and a large number of mobile, wireless devices, such as mobile telephones, smartphones, laptop and tablet computers, wearable devices, vehicles, and the like. On a very high level, wireless communication networks standardized by the Third Generation Partnership Program (3GPP) can be said to comprise a wireless device (often called User Equipment, or UE), a Radio Access Network (RAN), and a Core Network (CN), as depicted in block diagram form in FIG. 1. The UE is a wireless device (which may be mobile) used by the user to wirelessly access the network. The RAN comprises radio base stations (RBS, also known as eNB or gNB) which are responsible for providing wireless radio communication with the wireless device and connecting the wireless device to the core network. As well known in the art, Radio Frequency (RF) carrier waves are modulated with information, and transmitted from the RBS to wireless devices (downlink transmissions), and vice versa (uplink transmissions). The CN comprises several types of core network functions which are responsible for various tasks such as handling the mobility of wireless devices, interconnecting to data networks, packet routing and forwarding, authentication and accounting, and other functions.

Wireless communication networks continue to grow in technological sophistication, system capacity, data rates, bandwidth, supported services, and the like. To accommodate both more users and a wider range of types of devices that may benefit from wireless communications, the technical standards governing the operation of wireless communication networks continue to evolve. The fourth generation of network standards (4G, known as Long Term Evolution or LTE) has been deployed, and the fifth generation (5G, also known as New Radio, or NR) is in development.

5G is not yet fully defined, but in an advanced draft stage within the Third Generation Partnership Project (3GPP), the technical standards body. 5G wireless access will be realized by the evolution of LTE for existing spectrum, in combination with new radio access technologies that primarily target new spectrum. The NR air interface targets spectrum in the range from below 1 GHz up to 100 GHz, with initial deployments expected in frequency bands not utilized by LTE.

One of the advanced features of NR is the extensive use of beamforming for both control signaling and user data between RBS and wireless devices. Beamforming is the process of transmitting and receiving signals in relatively tightly focused RF carrier beams, aimed directly at the targeted receiver or transmitter. Beamforming may be implemented by combining signals from different individual elements of an antenna array in such a manner that signals to or from certain angles experience constructive interference (i.e., add signal powers), and those to or from other angles experience destructive interference (i.e., the signals cancel). Beamforming, also known as highly directional transmission/reception, is distinct from omnidirectional transmission/reception, in which radio signal power is roughly equal to/from all angles. Indeed, the improvement in signal strength, as compared with the omnidirectional case, is referred to as beamforming gain.

In LTE (and other legacy systems), cell specific reference signals (CRS) are broadcast throughout a cell's coverage area to facilitate detection of the radio base station (RBS) by nearby wireless devices. The CRS are broadcast using a single RF carrier beam that is beamformed to cover the cell's entire coverage area—i.e., an omnidirectional beam if the RBS is near the center of the coverage area. Accordingly, the CRS carrier beam has a relatively low beamforming gain. The CRS are used by wireless devices to perform radio quality measurements.

Some radio quality measurements are reported to the RBS to facilitate mobility and load balancing decisions. Specifically, in LTE, Reference Signal Received Quality (RSRQ) is an important radio signal measurement metric that is used by numerous mobility and load balancing features in LTE RAN systems.

As mentioned above, narrower and more directed RF beams have a significantly higher beamforming gain than wider beams which cover the complete cell. Deployed systems, such as LTE, generally use fewer, wider beams for common control signal, including CRS, and narrower beams for more dedicated signaling, including the data payload to the wireless devices.

The 3GPP standards define Transmission Modes (TM), which define the degree of beamforming for particular transmissions. For example, at TM3, the beamforming gain for CRS and data is the same, while at TM8 the beamforming gain for the data is several times higher than that for the CRS.

Reference Signal Received Power (RSRP) is defined as the linear average over the power contributions (in Watts) of the resource elements that carry CRS within the considered measurement frequency bandwidth. For RSRP determination, the CRS R0 shall be used, according 3GPP Technical Standard (TS) 36.211. If the wireless device can reliably detect that R1 is available, it may use R1 in addition to R0 to determine RSRP. The reference point for the RSRP measurement shall be the antenna connector of the wireless device.

Reference Signal Received Quality (RSRQ) is defined as the ratio N×RSRP/(E-UTRA carrier RSSI), where N is the number of resource blocks of the E-UTRA carrier RSSI measurement bandwidth (where RSSI is the Received Signal Strength Indicator). The measurements in the numerator and denominator shall be made over the same set of resource blocks. RSRP and RSRQ are defined in 3GPP TS 36.214 v12.0.0 (2014-09).

E-UTRA Carrier Received Signal Strength Indicator (RSSI), comprises the linear average of the total received power (in Watts) observed only in OFDM symbols containing reference symbols for antenna port 0, in the measurement bandwidth, over N number of resource blocks by the UE from all sources—including co-channel serving and non-serving cells, adjacent channel interference, thermal noise etc. If higher-layer signaling indicates certain subframes for performing RSRQ measurements, then RSSI is measured over all OFDM symbols in the indicated subframes. The reference point for the RSRQ shall be the antenna connector of the wireless device. If receiver diversity is used by the wireless device, the reported RSRQ value shall not be lower than the corresponding RSRP of any of the individual diversity branches.

RSRQ is intended to represent the downlink signal quality. However, since the denominator (RSSI) includes power from all sources, RSRQ is impacted not only by other cell interference, external interference, and thermal noise (which all degrade signal quality) but also by the traffic load on the serving cell (which does not degrade signal quality). In non-beamformed systems, RSRQ values above −11 to −13 dB are typically largely determined by own-cell load, but can also be impacted by interference from other cells or external sources, with no indication as to which is dominating. Below these levels, interference or thermal noise become increasingly dominant and RSRQ drops rapidly with decreasing serving cell RSRP.

The currently-used radio quality measurements were developed at a time when beamformed data transmissions were rare, and they were not taken into consideration. Currently, when transmitting beamformed data in the downlink, the quality measurements performed by the wireless device can drastically fluctuate and deteriorate. This can have a deleterious effect on legacy features in the RBS that rely on these quality measurements.

As discussed above, the denominator (RSSI) of RSRQ includes power from all sources. When applying beamforming with high gain on the data transmission, the data part of the RSSI will increase proportionally to the applied beamforming gain of the data transmission reaching the measuring wireless device (even if the data are not intended for it, but for a nearby wireless device). This will further decrease the measured RSRQ value. The measured RSRQ value can decrease below the reportable range defined by 3GPP even in good radio conditions (low noise and interference).

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, the radio base station (RBS) of a wireless communication network can indicate to a wireless device where in the frequency domain to perform radio quality measurements. If the RBS determines that one or more wireless devices (including those that are idle) are in risk of performing deteriorated quality measurements, it refrains from scheduling beamformed downlink data in the frequency region where the wireless devices perform quality measurements when the reference signals (e.g., Cell Specific Reference Signals, or CRS) are broadcast. This avoids deterioration of the RSRQ due to beamforming gain, and allows existing legacy features that rely on RSRQ to continue to function as originally intended. The restriction is only on beamformed data—the transmission of non-beamformed data in the relevant bandwidth is already accounted for in the use of RSRQ measurements. While the scheduling restriction imposed is small, in one embodiment it is further minimized by applying the restriction only in low traffic load conditions. In another embodiment, wireless devices are instructed to perform measurements only during specific time slots, and the beamforming scheduling restriction is applied only then.

One embodiment relates to a method of transmitting signals to one or more wireless devices in a cell of a wireless communication network. A time and a frequency range in which a wireless device will perform radio quality measurements is determined. Reference signals are broadcast during the determined time in the determined frequency range to facilitate wireless device radio quality measurements. The radio base station selectively refrains from scheduling beamformed downlink transmissions during the determined time in the determined frequency range.

Another embodiment relates to a radio base station operative in a cell of a wireless communication network. The radio base station includes a transceiver and processing circuitry operatively connected to the transceiver. The processing circuitry is characterized by being adapted to determine a time and a frequency range in which a wireless device will perform radio quality measurements; broadcast reference signals during the determined time in the determined frequency range to facilitate wireless device radio quality measurements; and selectively refrain from scheduling beamformed downlink transmissions during the determined time in the determined frequency range.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 5 is a diagram of hardware modules in processing circuitry in the radio base station.

FIG. 6 is a diagram of software executed by processing circuitry in the radio base station.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
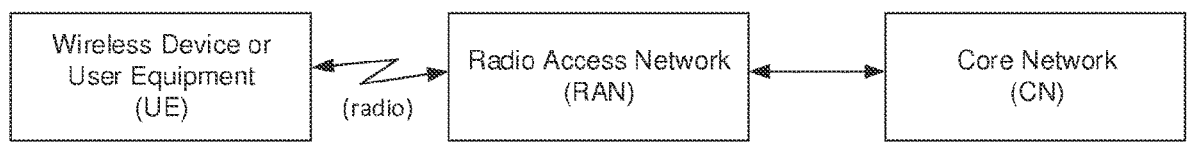
FIG. 1 is a block diagram of a wireless communication network.
Figure 2:
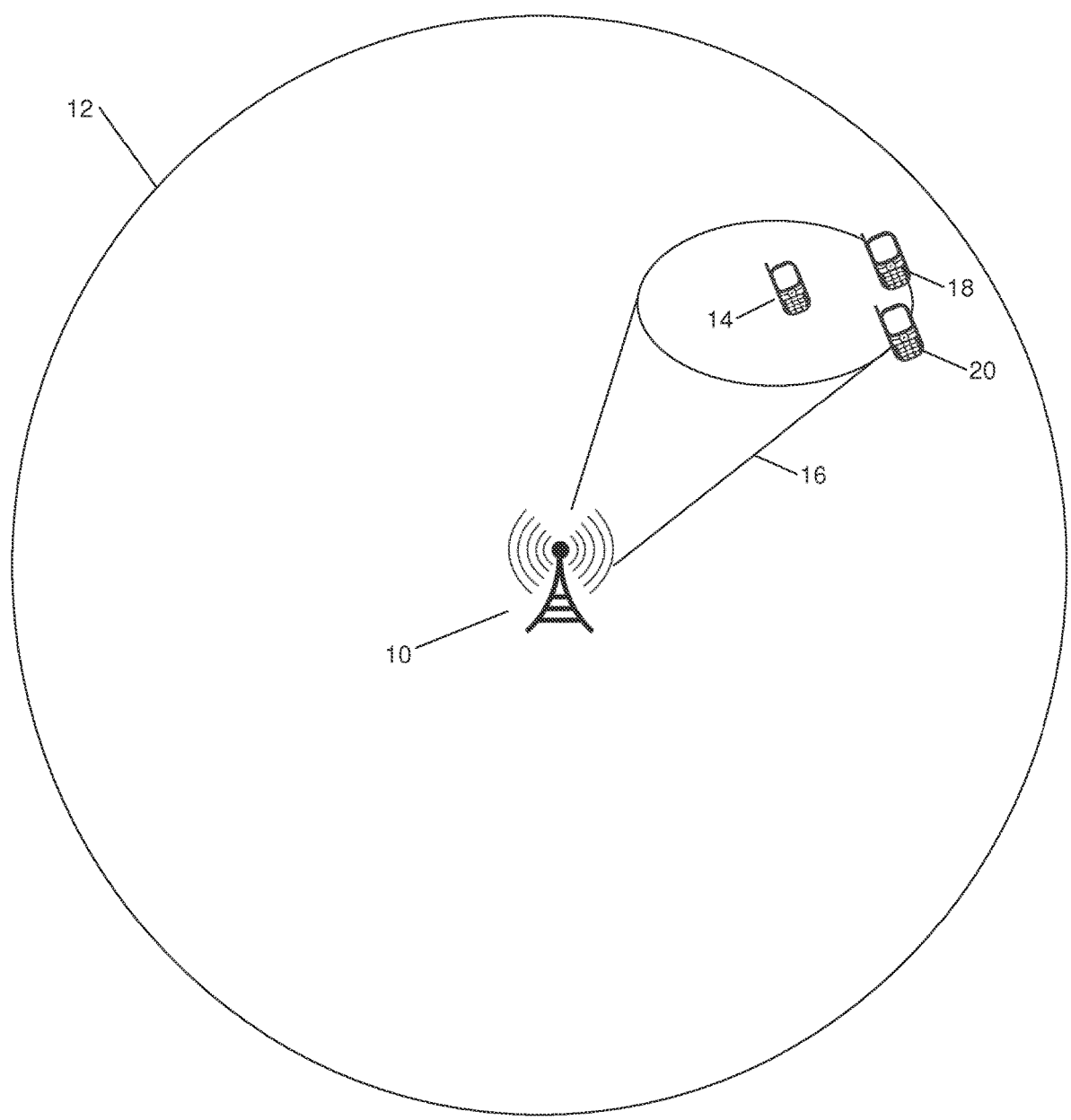
FIG. 2 is a diagram of beamformed transmission in a cell of a wireless communication network.

FIG. 2 depicts a radio base station 10 operative in a wireless communication network, such as a 4G 3GPP LTE network implementing Active Antenna System (AAS). The radio base station 10 provides wireless communication services to a plurality of wireless devices 14, 18, 20, also referred to as User Equipment (UE), within the geographic extent of a service area, or cell 12. To facilitate assessment of the air interface by wireless devices 14, 18, 20, the radio base station 10 broadcasts cell specific reference signals (CRS) throughout the cell 12. Due to the location of the radio base station 10 near the center of the cell 12, the CRS are broadcast using an RF carrier in an omnidirectional beam (not shown), which covers all directions of the cell substantially equally. Accordingly, the CRS carrier beam has a very low beamforming gain. The CRS are used by wireless devices 14, 18, 20 to perform radio quality measurements, such as Reference Signal Received Quality (RSRQ). Note, however, that the location of the radio base station 10 with respect to the cell 12 is a limitation of embodiments of the present invention. For example, a radio base station 10 could provide coverage of a cell 12 from the cell edge, or may broadcast CRS into a sector (e.g., 120 degrees of a cell, in azimuth). In these cases, the CRS carrier beam may not be omnidirectional. However, it will generally have a lower beamforming gain than data transmissions to a wireless device that are highly directional (i.e., tightly focused, with high beamforming gain).

FIG. 2 also depicts the radio base station 10 transmitting data to a wireless device 14 over an RF carrier in a beamformed wave 16. Although tightly focused and directed toward an (estimated) location of the intended recipient wireless device 14, the beamformed wave 16 in fact is also received by wireless devices 18 and 20.

As discussed above, RSRQ is defined as the ratio:

$$RSRQ = \frac{N \cdot RSRP}{RSSI}$$

where
RSRP is the Received Signal Reference Power;
RSSI is the Received Signal Strength Indicator; and
N is the number of resource blocks of the E-UTRA carrier RSSI measurement bandwidth.

The denominator of this ratio, RSSI, is the total received power, which includes interference from other cells, external interference, and thermal noise (which all degrade signal quality) as well as the received traffic load in the serving cell 12 (which does not degrade signal quality). During the data transmission on beamformed wave 16, not only the wireless device 14, but also wireless devices 18 and 20 will measure a high RSSI, and hence low RSRQ, due to the high beamforming gain, even if channel conditions are good and actual received signal quality is excellent. In some cases, the wireless devices 14, 18, 20 may report such a low RSRQ, caused by the high beamforming gain of downlink RF beam 16, that the radio base station 10 forms an incorrect assessment of overall channel quality. This may, in turn, cause the radio base station 10 to take suboptimal action, such as handover errors (either missing a handoff or failing to initiate one that should occur). Idle UE cell reselection may also be negatively impacted.

According to embodiments of the present invention, to avoid causing deleterious effects on radio quality measurements by wireless devices 14, 18, 20, the radio base station 10 first determines a time and a frequency range in which a wireless device 14 will perform radio quality measurements. For example, the radio base station 10 may instruct the wireless device 14 to perform radio quality measurements during at least one of a specified time and a specified frequency range. One example of a specified time for a wireless device 14 to perform radio quality measurements is during subframes when a broadcast message or a synchronization signal are transmitted. One example of a specified frequency range within which a wireless device 14 should perform radio quality measurements is within the six center Physical Resource Blocks (PRB) of a carrier.

After determining a time and a frequency range in which a wireless device will perform radio quality measurements, the radio base station 10 broadcasts reference signals, such as CRS, during the determined time in the determined frequency range, to facilitate wireless device radio quality measurements. During this determined time, and in the determined frequency range, the radio base station 10 selectively refrains from scheduling beamformed downlink transmissions—that is, downlink transmissions having a greater beamforming gain than CRS broadcasts. However, during the determined time, and in the determined frequency range, the radio base station 10 may continue to schedule non-beamformed downlink transmissions to one or more wireless devices 14, 18, 20—that is, downlink transmissions having a beamforming gain comparable to CRS broadcasts. The legacy radio quality measurements, such as RSRQ, generally already account for own-cell, non-beamformed downlink transmissions, and such transmissions will not unduly degrade the RSRQ measurements.

By refraining from scheduling beamformed downlink transmissions while one or more wireless devices 14, 18, 20 may be making radio quality measurements, the radio base station 10 ensures that legacy features—such as those that rely on, or at least accept as input, RSRQ or other radio quality metrics—will continue to function as intended. That is, the radio base station 10 minimizes the deleterious effect, or distortion, caused by high beamforming gain (for which the RSRQ metric was not designed). The radio base station 10 may continue to otherwise utilize radio resources for transmitting non-beamformed downlink data.

It is anticipated that the overall scheduling restriction imposed by this selective refraining from scheduling beamformed downlink transmissions will be small. Accordingly, the impact on maximum system throughput will also be small.

However, in one embodiment, where this assumption of minimal impact may not apply, the application of the scheduling restriction is of a more dynamic nature. When the traffic load (e.g., measured as PRB utilization) is low in the cell 12, the radio base station 10 applies the beamformed transmission scheduling restriction. When one or more wireless devices 14, 18, 20 present in the cell 12 report full transmit buffers and request all available resources, the scheduling restriction is disabled. During this temporary inactivation of the scheduling restriction—that is, during the period in which beamfomed transmissions may be scheduled without restriction—any impact on the maximum throughput is avoided. When the cell 12 returns again to a low traffic state, the radio base station 10 again applies the scheduling restriction, refraining from scheduling beamformed transmissions in during times and in frequency ranges in which wireless devices 14, 18, 20 are performing radio quality measurements.

In another embodiment, the times during which beamformed transmissions are suppressed are minimized (concomitantly minimizing any impact on throughput) by instructing wireless devices 14, 18, 20 to perform measurements at specific time slots, during which beamforming is already restricted for other reasons. For example, features in various releases of wireless communication network operating protocols restrict the radio base station 10 from scheduling beamformed data in the six center PRBs, during certain time slots, to avoid collisions with other signals that periodically occupy those time/frequency resource. For example, it is restricted to schedule Transmission Mode 7 (TM7, defining beamforming on antenna port 5, defined in 3GPP Rel. 8) or TM8 (defining dual layer beamforming on antenna ports 7 and 8, defined in 3GPP Rel. 9) in the center PRBs in subframe 0; TM8 is suppressed at other times as well. Examples of signaling occurring in these PRBs, for which interference by beamformed transmissions is to be avoided, include the Physical Broadcast Channel (PBCH); the Primary and Secondary Synchronization Signals (PSS/SSS); and DeModulation Reference Signals (DMRS).

In another embodiment, the radio base station 10 transmits CRS on all PRB, but can instruct one or more wireless devices 14, 18, 20 to only perform radio quality measurements in the six center PRBs. In this embodiment, the radio base station 10 may transmit beamformed data in all frequencies other than the six center PRBs, without adversely impact the radio quality measurements by the relevant wireless devices 14, 18, 20. As well known in the art, the radio base station 10 may instruct the wireless devices 14, 18, 20 by including measurement information in System Information (SI) which is broadcast in the cell 12, or alternatively via Radio Resource Control (RRC) signaling of measurement configuration information to each wireless devices 14, 18, 20.

In another embodiment, the radio base station 10 takes advantage of existing restrictions in various releases of wireless communication network operating protocols which require wireless devices 14, 18, 20 to perform radio quality measurements only during certain time slots, for example, for Inter-Cell Interference Coordination (ICIC). The parameters used (e.g., measSubframePatternPCell) are defined in 3GPP TS 36-311. The radio base station 10 may avoid transmitting beamformed data to wireless devices 14, 18, 20 during these time slots. The radio base station 10 may freely schedule beamformed transmissions in other time slots, without risk of adversely affecting the radio quality measurements.

Embodiments of the present invention are only required if network operating features executed by the radio base station 10 utilize radio quality measurements reported by wireless devices 14, 18, 20. Accordingly, prior to scheduling beamformed downlink transmissions, the radio base station 10 should check whether any such operating features are enabled. If not, the impact of beamforming gain on, e.g., RSRQ is irrelevant and the scheduling restrictions need not be applied. However, if one or more such operating features is enabled, then the radio base station 10 utilizes one or more embodiments described herein to selectively refraining from scheduling beamformed downlink transmissions during the time(s) in the frequency range(s) during which it determines that a wireless device will perform radio quality measurements.

Figure 3:
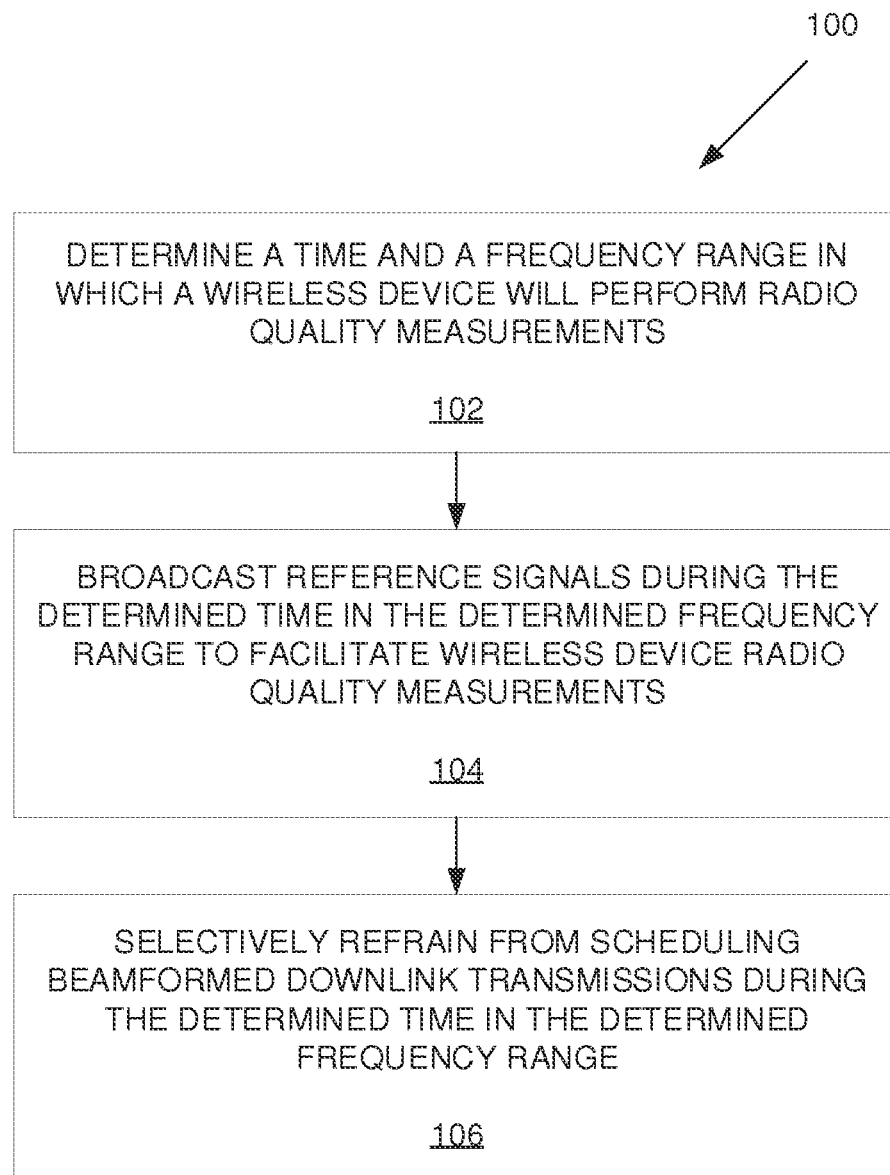
FIG. 3 is a flow diagram of a method of transmitting signals to one or more wireless devices in the cell.

FIG. 3 depicts the steps of a method 100, performed by a radio base station 10 operative in a cell 12 of a wireless communication network, of transmitting signals to one or more wireless devices 14, 18, 20 in the cell 12. A time and a frequency range in which a wireless device will perform radio quality measurements is determined (block 102). Reference signals are broadcast during the determined time in the determined frequency range to facilitate wireless device radio quality measurements (block 104). The radio base station 10 selectively refrains from scheduling beamformed downlink transmissions during the determined time in the determined frequency range (block 106).

Figure 4:
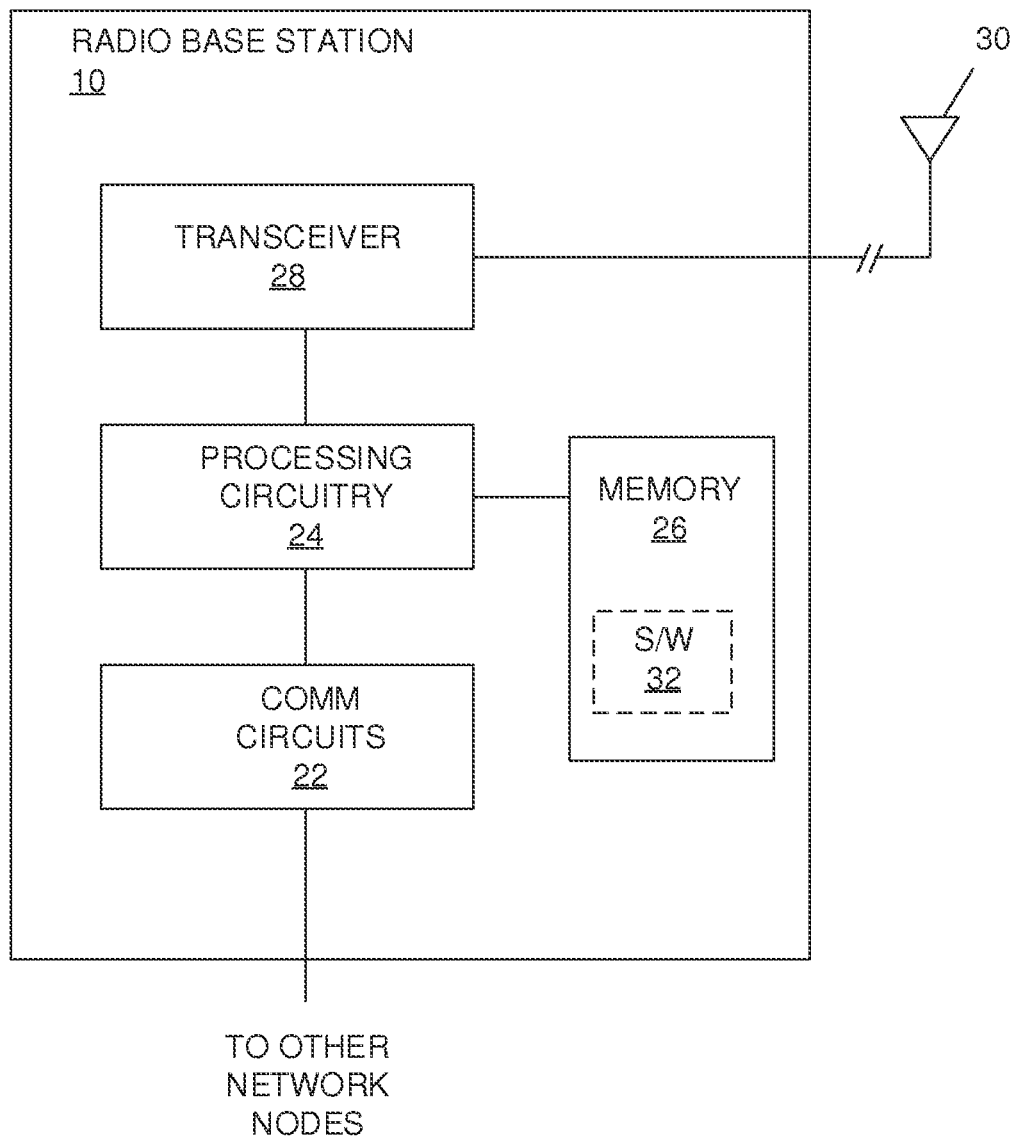
FIG. 4 is a block diagram of a radio base station.

FIG. 4 depicts a radio base station 10 operative in a wireless communication network. As those of skill in the art are aware, a radio base station 10 is a network node providing wireless communication services to one or more wireless devices 14, 18, 20, also referred to as User Equipment (UE) in a geographic region (known as a cell or sector) 12. The radio base station 10 in LTE is called an e-NodeB or eNB, and in NR is called a gNB; however the present invention is not limited to LTE or NR. A radio base station 10 includes communication circuits 22 operative to exchange data with other network nodes; processing circuitry 24; memory 26; and radio circuits, such as a transceiver 28, one or more antennas 30, and the like, to effect wireless communication across an air interface to one or more wireless devices 14, 18, 20. As those of skill in the art are aware, and as indicated by the continuation lines in the antenna feed line of FIG. 4, the antenna(s) 30 may be physically located separately from the radio base station 10, such as mounted on a tower, building, or the like. Although the memory 26 is depicted as being separate from the processing circuitry 24, those of skill in the art understand that the processing circuitry 24 includes internal memory, such as a cache memory or register files. Those of skill in the art additionally understand that virtualization techniques allow some functions nominally executed by the processing circuitry 24 to actually be executed by other hardware, perhaps remotely located (e.g., in the so-called "cloud").

According to embodiments of the present invention, the memory 26 is operative to store, and the processing circuitry 24 operative to execute, software 32 which when executed is operative to cause the base station 10 to execute the method 100 described herein.

The processing circuitry 24 may comprise any one or more sequential state machines operative to execute machine instructions stored as machine-readable computer programs in the memory 26, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP); or any combination of the above.

The memory 26 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The radio circuits may comprise one or more transceivers 28 used to communicate with one or more other transceivers via a Radio Access Network (RAN) according to one or more communication protocols known in the art or that may be developed, such as IEEE 802.xx, CDMA, WCDMA, GSM, UTRAN, LTE, NR, LTE-M, NB-IoT, WiMax, or the like. The transceiver 28 implements transmitter and receiver functionality appropriate to the Radio Access Network links (e.g., frequency allocations and the like). The transmitter and receiver functions may share circuit components and/or software, or alternatively may be implemented separately.

The communication circuits 22 may comprise a receiver and transmitter interface used to communicate with one or more other nodes over a communication network according to one or more communication protocols known in the art or that may be developed, such as Ethernet, TCP/IP, SONET, ATM, SIP, or the like. The communication circuits 22 implement receiver and transmitter functionality appropriate to the communication network links (e.g., optical, electrical, and the like). The transmitter and receiver functions may share circuit components and/or software, or alternatively may be implemented separately.

FIG. 5 illustrates example processing circuitry 24, such as that in the radio base station 10 of FIG. 4. The processing circuitry 24 may comprise one or more physical units. In particular, the processing circuitry 24 may comprise a time and frequency range determining unit 34; a reference signal broadcasting unit 36; and a beamformed transmission scheduling refraining unit 38. The time and frequency range determining unit 34 is configured to determine a time and a frequency range in which a wireless device will perform radio quality measurements. The reference signal broadcasting unit 36 is configured to broadcast reference signals during the determined time in the determined frequency range to facilitate wireless device radio quality measurements. The beamformed transmission scheduling refraining unit 38 is configured to selectively refrain from scheduling beamformed downlink transmissions during the determined time in the determined frequency range.

FIG. 6 illustrates example software 32, such as that in the memory 26 of the network node 10 of FIG. 4. The software 32 may comprise one or more software modules. In particular, the software 32 may comprise a time and frequency range determining unit 40; a reference signal broadcasting unit 42; and a beamformed transmission scheduling refraining unit 44. The time and frequency range determining unit 40 is configured to determine a time and a frequency range in which a wireless device will perform radio quality measurements. The reference signal broadcasting unit 42 is configured to broadcast reference signals during the determined time in the determined frequency range to facilitate wireless device radio quality measurements. The beamformed transmission scheduling refraining unit 44 is configured to selectively refrain from scheduling beamformed downlink transmissions during the determined time in the determined frequency range.

Embodiments of the present invention present numerous advantages over the prior art. By avoiding transmitting beamformed data while one or more wireless devices 14, 18, 20 might perform radio quality measurements, existing legacy features that rely on, e.g., RSRQ can continue to function as originally intended. The "reserved" radio resources can still be utilized for non-beamformed data. The non-beamformed data will impact the RSRQ measurements even though it does not impact the signal quality—which is the same as behavior as in legacy non-beamforming systems, and hence is accounted for. Numerous embodiments present alternatives which minimize any impact on system throughput.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by a base station operative in a cell of a wireless communication network, of transmitting signals to one or more wireless devices in the cell, the method comprising:
    determining a time and a frequency range in which a first wireless device of the one or more wireless devices will perform radio quality measurements;
    broadcasting reference signals during the determined time in the determined frequency range using a single radio frequency carrier beam that is beamformed to cover the cell's entire coverage area, to facilitate wireless device radio quality measurements; and
    selectively refraining from scheduling beamformed downlink transmissions, which have a greater beamforming gain than the broadcast reference signals, to any of the one or more wireless devices during the determined time in the determined frequency range.

2. The method of claim 1, wherein the time during which the first wireless device will perform radio quality measurements is at any time.

3. The method of claim 1, wherein the radio quality measurements are Reference Signal Received Quality measurements.

4. The method of claim 1, further comprising scheduling non-beamformed downlink transmissions to the one or more wireless devices during the determined time in the determined frequency range.

5. The method of claim 1, further comprising:
    prior to the determining the time and the frequency range:
        determining whether any enabled operating features use the radio quality measurements reported by wireless devices; and
        if not, omitting the refraining step.

6. The method of claim 1, wherein the selectively refraining from scheduling beamformed downlink transmissions during the determined time in the determined frequency range comprises refraining from scheduling beamformed downlink transmissions only when a traffic load in the cell is below a first predetermined threshold.

7. The method of claim 1, wherein the selectively refraining from scheduling beamformed downlink transmissions during the determined time in the determined frequency range comprises scheduling beamformed downlink transmissions during the determined time in the determined frequency range if one or more wireless devices request air interface resources for beamformed downlink transmissions in excess of a second predetermined threshold.

8. The method of claim 1, wherein the determining the time and the frequency range comprises instructing the wireless device to perform radio quality measurements during the specified time and the specified frequency range.

9. The method of claim 8, wherein the instructing the wireless device to perform radio quality measurements during the specified time and the specified frequency range comprises instructing the wireless device by broadcasting system information or transmitting Radio Resource Control measurement configuration information to the wireless device.

10. The method of claim 8, wherein the instructing the wireless device to perform radio quality measurements comprises instructing the wireless device to perform radio quality measurements in a plurality of the center physical resource blocks of a carrier, and during subframes in which a broadcast message or a synchronization signal are transmitted.

11. The method of claim 8:
wherein the instructing the wireless device to perform radio quality measurements comprises instructing the wireless device to perform radio quality measurements during subframes in which wireless devices are otherwise required to perform measurements; and
wherein the selectively refraining from scheduling beamformed downlink transmissions comprises refraining from scheduling beamformed downlink transmissions during these subframes.

12. A radio base station operative in a cell of a wireless communication network, the radio base station comprising:
a transceiver; and
processing circuitry operatively connected to the transceiver, the processing circuitry configured to:
determine a time and a frequency range in which a wireless device will perform radio quality measurements;
broadcast reference signals during the determined time in the determined frequency range using a single radio frequency carrier beam that is beamformed to cover the cell's entire coverage area, to facilitate wireless device radio quality measurements; and
selectively refrain from scheduling beamformed downlink transmissions, which have a greater beamforming gain than the broadcast reference signals, to any of the one or more wireless devices during the determined time in the determined frequency range.

13. The radio base station of claim 12, wherein the time during which the first wireless device will perform radio quality measurements is at any time.

14. The radio base station of claim 12, wherein the radio quality measurements are Reference Signal Received Quality measurements.

15. The radio base station of claim 12, wherein the processing circuitry is configured to schedule non-beamformed downlink transmissions to one or more wireless devices during the determined time in the determined frequency range.

16. The radio base station of claim 12, wherein the processing circuitry is configured to, prior to the determining the time and the frequency range:
determine whether any enabled operating features use radio quality measurements reported by wireless devices; and
if not, omit the refraining.

17. The radio base station of claim 12, wherein the processing circuitry is configured to selectively refrain from scheduling beamformed downlink transmissions during the determined time in the determined frequency range by refraining from scheduling beamformed downlink transmissions only when a traffic load in the cell is below a predetermined threshold.

18. The radio base station of claim 12, wherein the processing circuitry is configured to selectively refrain from scheduling beamformed downlink transmissions during the determined time in the determined frequency range by scheduling beamformed downlink transmissions during the determined time in the determined frequency range if one or more wireless devices requests air interface resources in excess of a predetermined threshold.

19. The radio base station of claim 12, wherein the processing circuitry is configured to determine the time and the frequency range in which a wireless device will perform radio quality measurements by instructing the wireless device to perform radio quality measurements during the specified time and the specified frequency range.

20. The radio base station of claim 19, wherein the instructing the wireless device to perform radio quality measurements during the specified time and the specified frequency range comprises instructing the wireless device by broadcasting system information or transmitting Radio Resource Control measurement configuration information to the wireless device.

* * * * *